Figure 1:
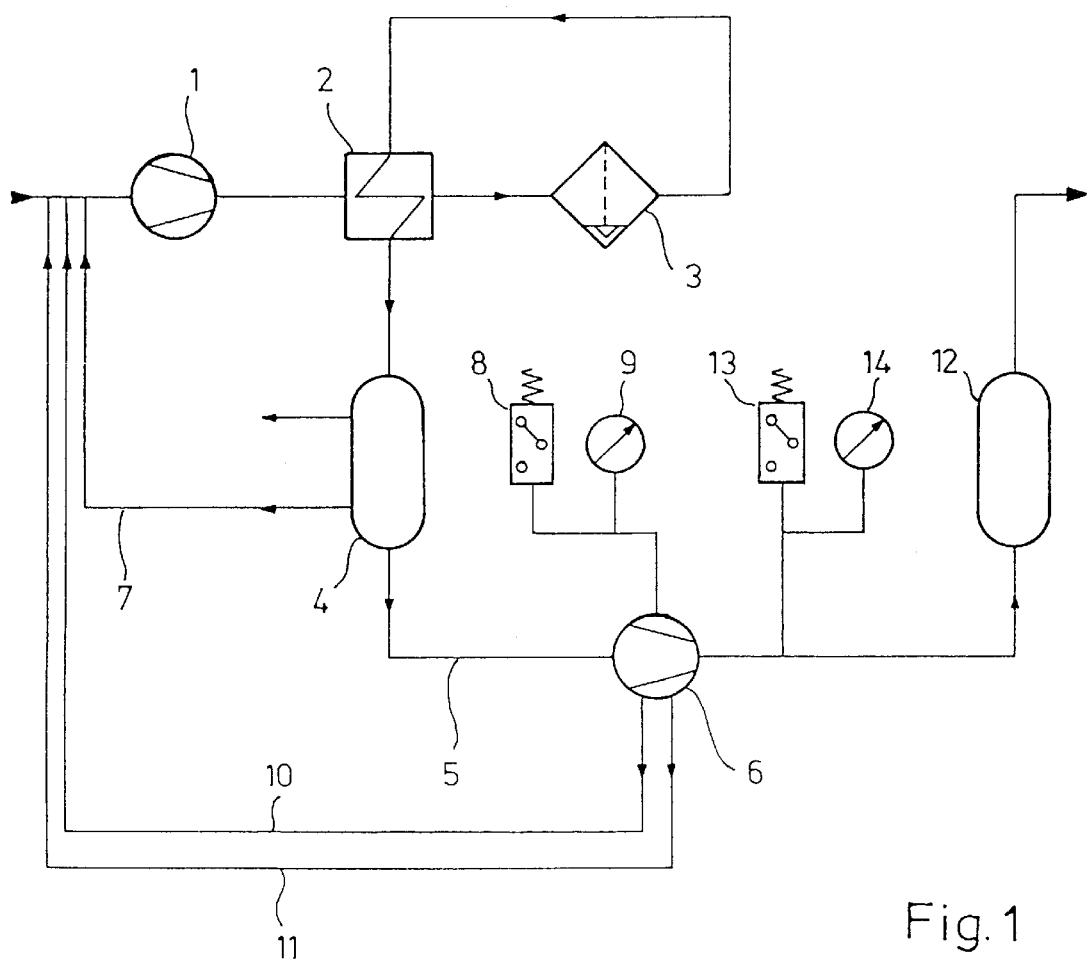

United States Patent
Dannöhl

[11] Patent Number: 5,987,917
[45] Date of Patent: Nov. 23, 1999

[54] PROCESS AND DEVICE FOR PRODUCING NITROGEN FROM AIR

[75] Inventor: Peter Fritz Dannöhl, Oberhausen-Buschhausen, Germany

[73] Assignee: Druckluff Dannöhl GmbH, Germany

[21] Appl. No.: 09/043,430

[22] PCT Filed: Jun. 21, 1997

[86] PCT No.: PCT/EP97/03263
§ 371 Date: Mar. 19, 1998
§ 102(e) Date: Mar. 19, 1998

[87] PCT Pub. No.: WO98/06664
PCT Pub. Date: Feb. 19, 1998

[30]      Foreign Application Priority Data

Aug. 8, 1996 [DE] Germany ............. 196 31 949

[51] Int. Cl.$^6$ .................................................. C01B 21/04
[52] U.S. Cl. .................. 62/640; 62/655; 95/54
[58] Field of Search ............... 62/640, 642, 655; 95/54

[56]              References Cited
U.S. PATENT DOCUMENTS 5,102,432  4/1992  Prasad ..................................... 95/54
5,582,030  12/1996  Dannohl ................................... 62/655

Primary Examiner—William Doerrler
Attorney, Agent, or Firm—Blakely Sokoloff Taylor & Zafman

[57] ABSTRACT

The air is compressed in a precompressor (1) to a prepressure, then cooled, cleaned and reheated. A heat exchanger (2) is used for simultaneous cooling and reheating. The separation of the nitrogen is effected in a separation device (4), which comprises a plurality of membrane separators. The concentrate, which is enriched with nitrogen, from the last stage is recirculated to the inlet side of the precompressor (1). The separated nitrogen is compressed to the nominal pressure in a final compressor (6) connected to the separation device (4). A pressure switch (8) controls the system such that the final compressor (6) only switches on during start-up when the working pressure of the separation device (4) has been reached. Up to this time the gas supplied from the separation device (4) is partially recirculated to the precompressor (1). There is also recirculation of the leakage nitrogen from the final compressor (6) to the precompressor (1).

12 Claims, 1 Drawing Sheet

PROCESS AND DEVICE FOR PRODUCING NITROGEN FROM AIR

The invention relates to a method and an apparatus for producing nitrogen at a nominal pressure in which air is precompressed in a precompression stage, then cooled, cleaned and reheated, whereafter separation of the nitrogen is effected in a separation stage and it is finally compressed to the nominal pressure in a final compression stage.

The main field of application of the invention is the production of high pressure nitrogen for injection moulding machines, in which the nitrogen is injected into the injection mould in order to produce hollow bodies. Such systems operate with the recirculation of nitrogen from the injection mould. The inlet of the final compression stage is thus at atmospheric pressure.

DE 4435702 A1 discloses part of such a system, namely the production of the nitrogen at the precompression pressure. This is of the order of 10 to 12 bar, determined by the separation stage. After depressurisation to atmospheric pressure, the nitrogen is brought in the final compression stage, which is not shown, to the order of 320 to 340 bar.

It is the object of the invention to simplify the production of nitrogen and substantially to reduce the necessary power requirement.

In order to solve this object the method referred to above is characterised in that the separation stage supplies the input pressure for the final compression stage, that the build-up of the inlet pressure of the final compression stage in the start-up phase is delayed by partial recirculation of the gases discharged from the separation stage to the inlet of the predepression stage and that the final compression stage is only switched on when the build-up of its inlet pressure is completed.

A substantial proportion of the compression work is thus saved by the fact that during continuous operation the pressure increase in the final compression stage does not begin at atmospheric pressure but at the outlet pressure of the separation stage. The two compression stages can be optimally matched to the attainment of the desired residual oxygen content.

The delayed switching on of the final compression stage facilitates its starting and avoids current peaks. Furthermore, a considerable energy saving results from the time delay.

Of significant importance is the fact that during the start-up phase before switching on the final compression stage the gas supplied from the separation stage is partially recirculated to the inlet of the precompression stage. This results in the desired residual oxygen content of the nitrogen being reached very rapidly. The recirculating gas is purified in the separation stage and thus increases the nitrogen content at the inlet of the precompression stage.

A further increase in the efficiency may be achieved by recirculating the nitrogen accumulating in the final compression stage as a result of internal leakage losses to the inlet of the precompression stage. The final compression stage thus operates without losses in this respect, the recirculated nitrogen again increasing the nitrogen content of the air at the inlet of the precompression stage.

The same applies to a further feature which is proposed, namely of performing the separation in a plurality of stages with gas recirculation to the inlet of the precompression stage, since the recycled gas is already enriched with nitrogen.

The advantages of the above features are produced regardless of the manner in which the air is cooled and reheated and the nitrogen is separated.

It is, however, very particularly advantageous to use the heat produced by the compression for reheating the air since this also contributes to the reduction of the energy requirement.

If, for instance, the compression is effected with oil cooling, the oil can give up its heat to the air before the latter is supplied to the separator.

Alternatively or additionally, there is the possibility in a further embodiment of the invention of using the heat produced from the cooling of the air for reheating the air.

The apparatus in accordance with the invention comprises an air precompressor, an air cooler connected downstream of the precompressor, a cleaning device connected downstream of the air cooler, a heating device connected downstream of the cleaning device, a nitrogen separation device connected downstream of the heating device and a nitrogen final compressor connected downstream of the separation device and in order to solve the object posed is characterised in that the inlet of the final compressor is connected to the separation device and is connected by means of a closable throttle to the inlet side of the precompressor and that a first pressure switch is provided which switches the final compressor on in the start-up phase as soon as the precompressor has built up the inlet pressure of the final compressor.

The final compressor is thus connected directly to the separation device and is only started when the precompressor has built up the pressure necessary for the separation device. This pressure build-up is delayed by partial recirculation of the gas supplied from the separation device. The desired residual oxygen content of the nitrogen is produced very rapidly during this phase.

As soon as the final compressor switches on the throttle is closed and the recirculation thus interrupted. The condensate valve of the final compressor, which is in any present, is preferably used as the closable throttle.

It is also advantageous to connect the final compressor via a leakage gas conduit to the inlet side of the precompressor in order thus to recycle the leakage nitrogen which inevitably accumulates in the process.

It is proposed in a further embodiment of the invention that the separation device has at least two membrane separators and that the concentrate outlet of at least one of the downstream membrane separators, preferably the concentrate outlet of the last membrane separator, is connected to the inlet side of the precompressor via a gas recirculation conduit. The recycled concentrate is already enriched with nitrogen and increases the nitrogen content of the inlet air of the precompressor whereby an increase in efficiency is also produced.

The heating device is preferably constructed as a heat exchanger, the hot side of which is connected downstream of the precompressor. The air which is naturally heated in the precompressor is thus used for preheating the air before entering into the separation device. The heat exchanger is responsible simultaneously for the cooling of the air discharging from the precompressor.

Under some circumstances this cooling is sufficient in order to carry out the subsequent cleaning of the air, preferably in a condensate separator. In other cases an additional cooling device can be connected upstream of the cleaning device.

It is also advantageous if a reservoir is connected downstream of the final compressor and a second pressure switch is associated with it which switches the precompressor and the final compressor off when the nominal pressure is reached in the reservoir and which switches the installation on again when the pressure in the reservoir falls below a predetermined pressure. The installation thus operates discontinuously and automatically adjusts itself to the prevailing demand. If the reservoir is sufficiently full, the installation is switched off. If the pressure in the reservoir subsequently falls below the predetermined pressure, firstly the precompressor and subsequently, as described above, the final compressor switch on.

The invention will be explained in more detail below with reference to a preferred exemplary embodiment in conjunction with the accompanying drawing. FIG. 1 is a flow diagram of an apparatus for producing nitrogen from air.

As illustrated, the apparatus has a precompressor 1, connected downstream of which is a heat exchanger 2. The precompressor 1 draws air in and compresses it to an intermediate pressure, whereby the air heats up. The heated air then gives up heat in the heat exchanger 2.

Connected downstream of the heat exchanger 2 is a cleaning device 3, which operates as a condensate separator and removes condensate, aerosols and solids from the cooled air.

The air is then passed through the heat exchanger 2 where it takes up heat which was given up by the air which was heated in the precompressor 1.

The parameters of the process are so set that the air flows at optimum pressure and optimum temperature into a separation device 4, which has a plurality of membrane separators. A multi-stage separation of the nitrogen from the air is effected in it.

The nitrogen flows with a high degree of purity via a nitrogen line 5 to a final compressor 6, which compresses the nitrogen to the nominal pressure.

The compression is thus carried out in two stages, the precompressor 1 operating with a high delivery rate and a relatively low pressure increase whilst the final compressor 6 brings the substantially smaller volume of nitrogen up to the relatively high nominal pressure. Rough calculations have shown that an energy saving of ca. 25% is achieved in this manner in comparison to a system in which the nitrogen is compressed from atmospheric pressure to the relatively high nominal pressure.

The separation device 4 operates with gas recycling in order to further increase the efficiency. For this purpose, it is connected by means of a gas recycling conduit 7 to the inlet side of the precompressor 1. The gas recycling conduit 7 branches off from the final stage of the separation device, that is to say at the last membrane separator, and conducts its concentrate, that is to say a gas which is already enriched with nitrogen, to the inlet side of the precompressor.

During the starting process only the precompressor 1 operates initially. Only when the minimum pressure of the separation device 4 has been reached is the final compressor 6 switched on, namely by means of a first pressure switch 8, which detects the pressure on the inlet side of the final compressor 6. An associated manometer 9 indicates this pressure.

The final compressor 6 is connected to the inlet side of the precompressor 10 via a conduit 10. The conduit 10 is connected to the condensate valve, which is not shown, of the final compressor 6. The condensate valve is open when there is no flow and acts during the start-up phase as a throttle for the recirculation of the gas supplied from the separation device 4. The pressure build-up upstream of the final compressor is thus delayed. When the precompressor 1 has built up the operating pressure necessary for the separation device 4, the desired residual oxygen content of the niitrogen is also reached. The final compressor 6 switches on, whereby the condensate valve is closed and the recirculation is thus interrupted.

A leakage gas conduit 11 is also provided which supplies the leakage nitrogen, which inevitably accumulates in the final compressor 6, to the inlet side of the precompressor 1.

Connected downstream of the final compressor 6 is a reservoir 12 which supplies the consumer or consumers. Associated with the reservoir 12 is a second pressure switch 13, which switches off the entire system as soon as the nominal pressure is reached in the reservoir 12. Also associated with the second pressure switch 13 is a manometer 14.

If the pressure in the reservoir 12 falls below a predetermined pressure after the system has been switched off, the second pressure switch 13 ensures that, as described above, firstly the precompressor 1 and then, in cooperation with the first pressure switch 8, the final compressor 6 are switched on.

Overall, a system is produced which is of very simple construction and can be operated in an energy-saving manner. The thermal transfer between the heated air and the air to be reheated also contributes to the latter.

Modifications are of course possible within the scope of the invention. Thus a device can be associated with the system which adjusts the degree of purity of the nitrogen. Furthermore, the compressor, which is shown as being of single stage type, can also operate in a multi-stage manner. The number of the stages of the separation device is selected to match the predetermined operational parameters, whereby a plurality of stages can also be connected in parallel with one another. The heat exchanger operates in the illustrated exemplary embodiment as a heating device for the air which is to be reheated and as a cooling device for the compressed air discharged from the precompressor. If this cooling effect is not adequate, an additional cooling device can be connected upstream of the subsequent cleaning device. Similarly, an additional heating device can be connected upstream of the separation device.

I claim:

1. Method of producing nitrogen at a nominal pressure, the method comprising the following steps:

air is drawn into an inlet of a precompression stage and precompressed in the latter, the precompressed air is cooled, the cooled air is cleaned, the cleaned air is reheated, nitrogen is separated from the reheated air in a separation stage and the separated nitrogen is compressed in a final compression stage from an input pressure of this stage to the nominal pressure;

and whereby the method goes through a start-up phase on starting which comprises the following steps:

the build-up of the inlet pressure of the final compression stage is delayed by partially recirculating the gas discharged from the separation stage to the inlet of the precompression stage, and the final compression stage is only switched on when the build-up of its inlet pressure is completed.

2. Method as claimed in claim 1 wherein the nitrogen accumulating in the final compression stage as a result of internal leakage losses is recirculated to the inlet of the precompression stage.

3. Method as claimed in claim 1 wherein the nitrogen is separated in a plurality of stages with gas recirculation to the inlet of the precompression stage.

4. Method as claimed in claim 1 wherein heat is produced in the precompression and this heat is used for reheating the air.

5. Method as claimed in claim 4 wherein heat is produced in the cooling of the air and this heat is used for reheating the air.

6. Method as claimed in claim 1 wherein heat is produced in the cooling of the air and this heat is used for reheating the air.

7. Apparatus for producing nitrogen at a nominal pressure including

- an air precompressor, which has an inlet side and an outlet side,
- an air cooler connected to the outlet side of the precompressor,
- a cleaning device connected downstream of the air cooler,
- a heating device connected downstream of the cleaning device,
- a nitrogen separation device connected downstream of the heating device,
- a nitrogen final compressor which produces the nominal pressure and has an inlet side and an outlet side and whose inlet side is connected to the separation device, whereby the final compressor is connected to the inlet side of the precompressor via a closable throttle, and
- a first pressure switch, which switches the final compressor on in dependence on the pressure at the suction side of the final compressor.

8. Apparatus as claimed in claim 7 wherein the condensate valve, which is in any event present, of the final compressor is used as the closable throttle.

9. Apparatus as claimed in claim 7 wherein the final compressor is connected to the inlet side of the precompressor by means of a leakage gas conduit.

10. Apparatus as claimed in claim 7 wherein the separation device has at least two membrane separators with a respective permeate outlet and concentrate outlet and wherein the concentrate outlet of at least one of the downstream membrane separators, preferably the concentrate outlet of the last membrane separator, is connected to the inlet side of the precompressor via a gas recirculation conduit.

11. Apparatus as claimed in claim 7 wherein the heating device is constructed as a heat exchanger with a hot side and a cold side and wherein the hot side of the heat exchanger is connected downstream of the precompressor.

12. Apparatus as claimed in claim 7 wherein connected downstream of the final compressor there is a reservoir and associated with it there is a second pressure switch which switches off the precompressor and the final compressor and switches them on again in dependence on the pressure in the reservoir.

\* \* \* \* \*

UNITED STATES PATENT AND TRADEMARK OFFICE
CERTIFICATE OF CORRECTION

PATENT NO. : 5,987,917
DATED : November 23, 1999
INVENTOR(S) : Dannöhl It is certified that error appears in the above-identified patent and that said Letters Patent is hereby corrected as shown below:

In column 4, line 1, delete "niitrogen" and insert -- nitrogen -- .

Signed and Sealed this

Third Day of April, 2001

NICHOLAS P. GODICI

*Attest:*

*Attesting Officer*   *Acting Director of the United States Patent and Trademark Office*